(12) United States Patent
Fröhlich et al.

(10) Patent No.: US 6,296,820 B1
(45) Date of Patent: Oct. 2, 2001

(54) METHOD FOR THE REDUCTION OF $NO_x$ EMISSIONS

(75) Inventors: Armin Fröhlich, Kall-Sötenich; Maria Regina Mönnig, Köln; Siegfried Happrich, Kall-Sötenich, all of (DE)

(73) Assignee: Rheinkalk GmbH & Co. KG, Wulfrath (DE)

( * ) Notice: Subject to any disclaimer, the term of this patent is extended or adjusted under 35 U.S.C. 154(b) by 0 days.

(21) Appl. No.: 09/177,309

(22) Filed: Oct. 22, 1998

(30) Foreign Application Priority Data

Oct. 23, 1997 (DE) .............................. 197 46 817

(51) Int. Cl.[7] .............................. C01B 21/00; C04B 2/70
(52) U.S. Cl. .............................. 423/235; 106/761; 106/762
(58) Field of Search .............................. 423/235, 239.1; 106/739, 759, 761, 762

(56) References Cited

U.S. PATENT DOCUMENTS 4,080,218 * 3/1978 Mori et al. .............................. 423/239.1

FOREIGN PATENT DOCUMENTS

019509801 A1 * 5/1996 (DE) .
19611898 10/1997 (DE) .

OTHER PUBLICATIONS

Stand der $NO_x$–Minderung in der Zement–industrie, Von W. Billhardt, Erwitte, K. Kuhlmann, Forschungsinstitut der Zementindustrie, Dusseldorf, W. Ruhland, Wiesbaden, M. Schneider, Forschungsinstitut der Zement–industrie, Dusseldorf und H. Xeller, Heidelberg/Deutschland.

* cited by examiner

Primary Examiner—Steven P. Griffin
Assistant Examiner—Maribel Medina
(74) Attorney, Agent, or Firm—Nils H. Ljungman & Associates (57) ABSTRACT

A method and an apparatus to reduce $NO_x$ emissions in the exhaust gas from installations that form $NO_x$ as a result of combustion processes, such as the production of cement clinker, in which the $NO_x$ decomposition occurs in the temperature range from approximately 450° C. to approximately 850° C. and in an oxidizing atmosphere with a fuel-air ratio (Lambda) approximately equal to 1.

14 Claims, 7 Drawing Sheets

METHOD FOR THE REDUCTION OF $NO_x$ EMISSIONS

BACKGROUND OF THE INVENTION

1. Field of the Invention

The present invention relates to a method and an apparatus to reduce NOx emissions in the exhaust gas from installations that form NOx as a result of combustion processes, in which the NOx decomposition occurs in the temperature range from approximately 450° C. to approximately 850° C. and in an oxidizing atmosphere with a fuel-air ratio (Lambda) is greater than approximately 1.

2. Background Information

Nitrogen oxides, $NO_x$, including at least nitrogen monoxide, NO, and nitrogen dioxide, $NO_2$, are formed in essentially all industrial combustion processes from atmospheric oxygen, atmospheric nitrogen and the compounds containing nitrogen in the fuel. At combustion temperatures above about 1600° C., with sufficiently long dwell times of the combustion gases in the flame, the essential product formed from the molecular nitrogen can be nitrogen monoxide, NO.

The nitrogen monoxide NO formed above about 1600° C. is a strongly endothermic compound and is partly decomposed into nitrogen and oxygen in the temperature range from approximately 800° C. to about 450° C. When rapidly cooled to temperatures below about 450° C., nitrogen monoxide NO can be obtained in metastable form.

One example of such an industrial process is the production of cement clinker in production facilities with rotary kilns and suspension-type gas heat exchangers.

Cement clinker refers to the glass-like stone-like material of, for example, clay and limestone, fused in the cement formation process.

Cement clinker is generally produced by the thermal treatment of a prepared, preheated mixture of raw materials in a rotary kiln. In facilities that recover and recycle the kiln waste heat, the raw material thereby can pass through a number of gas heat exchanger stages, where it can be some or all of pre-heated, subjected to a preliminary neutralization or calcined, sintered into cement clinker in the sintering zone of the rotary kiln and then cooled.

Flame temperatures of approximately 2000° C. can be reached in the sintering zone of the rotary kiln. In addition to nitrogen monoxide, NO, nitrogen dioxide, $NO_2$, can also be formed, namely in a ratio of about 90% $NO_x$ to about 10% $NO_2$.

The heat exchanger stages can generally be realized in the form of cyclones, in which cyclone heat exchangers the raw material, which raw material is heated by the hot waste gases flowing in countercurrent out of the rotary kiln, is separated. The kiln exhaust gas can be at a temperature of approximately 1000° C. as it enters the lowest stage of the heat exchanger. The exhaust gas can leave the uppermost stage of the heat exchanger at a temperature of approximately 250° C. to 350° C.

The heat exchangers can also possibly be concurrent or cocurrent flow heat exchangers.

The percentage of nitrogen oxides, $NO_x$, in the exhaust gas as a whole can be different from plant to plant, because there can be different operating conditions in all furnaces. Within a single furnace, large fluctuations can also be observed in the concentrations of the nitrogen oxides, depending, at least in part, on the individual operating conditions and the different fuels used.

To comply with the limits specified by the applicable laws and regulations, measures are typically required to reduce the content of nitrogen oxides. In known devices, and taking into consideration the interrelationships of the fuel characteristics, flame temperature, flame type, hold time and fuel-air ratio, it is known that at least some parameters can be influenced, primarily to reduce the formation of nitrogen oxides. In the parts of the installation that are downstream in the direction of the exhaust gas, however, the dwell time of the kiln gases in the temperature range of approximately 450° C. to approximately 800° C., has not so far been taken into consideration as a factor that can be influenced regarding the $NO_x$ reduction.

In other words, the hold up time of kiln gases in the temperature range of about 450° C. to about 800° C., has essentially not been utilized as a variable that can substantially reduce the amount of $NO_x$ emissions.

The conditions in the heat exchanger are not static but a dynamic equilibrium. Therefore the $NO_x$ decomposition can be very decisively a function of the dwell time of the gas in the temperature range from approximately 450° C. to approximately 800° C. Accordingly, the decomposition rate can be determined by the distribution of the air flow velocity in the relevant temperature range of the heat exchanger. Thus the decomposition, as well as the formation, can be influenced by the temperature, the fuel-air ratio (Lambda) and by the dwell time.

For example, known publication ZKG International 49 (1996), No. 10, Pages 545 to 560, describes a method to reduce the $NO_x$ concentration in the exhaust gases from a rotary kiln by the addition of the reduction agent ammonia, $NH_3$, in gas form or also in the form of ammonia liquor or ammonia water or ammonium hydroxide in the heat exchanger area. However, an optimum $NH_3$ reduction is achieved only at higher temperatures of approximately 900° C.

Known processes also teach that other process measures can be adopted, e.g. by an excess of carbon monoxide, CO, to achieve reducing conditions where Lambda is less than 1 in the calcining furnace, and to have a positive influence on the decomposition of nitrogen oxide, NO, by creating longer reaction times and retaining the reducing conditions. It must also be taken into consideration, however, that the allowable limits for CO emissions cannot be exceeded. For example, a graduated combustion technology is required for the secondary combustion of the CO.

The method of the prior art for use on combustion engines, as disclosed in German Patent No. 196 11 898 A1, operates on the basis of a fundamentally different method with oxygen enrichment and the extensive exclusion of atmospheric nitrogen from participation in the combustion process, so that a sharply reduced $NO_x$ formation occurs as a result of the nitrogen content of the fuel.

One disadvantage of these process control measures is that they can require high capital investments for the special construction of the plant and additional equipment. The conversion of existing plants can be particularly expensive. The use of $NH_3$, in selective non-catalytic reduction, for example, can also result in high operating costs. Additional safety equipment can be required, for example.

OBJECT OF THE INVENTION

The object of the present invention, in the temperature range from approximately 450° C. to approximately 800° C. and in an oxidizing atmosphere with a fuel-air ratio, Lambda is greater than approximately to 1, is to come as close as possible to thermodynamic equilibrium in the $NO_x$ decomposition, and to safely and reliably keep the exhaust gas from plants with $NO_x$ formation resulting from combustion processes within the legal limits for emissions, without requiring substantially expensive installations and/ or conversion operations.

SUMMARY OF THE INVENTION

The present invention teaches that this object can be accomplished by conducting the exhaust gas containing $NO_x$ through a dwell chamber or hold-up chamber to increase the dwell time.

In one advantageous configuration, the increase in the dwell time of the exhaust gases containing $NO_x$ in the dwell chamber can be achieved by reducing the flow velocity between the dwell chamber entry and the dwell chamber exit, preferably by increasing the cross section of the dwell chamber through which the flow passes.

The exhaust gas containing $NO_x$ can be transported through a dwell chamber which is realized in the form of a spiral casing with a cylindrical inlet tube or submerged inlet tube or vortex tube finder, e.g. through a cyclone, whereby the extension of the dwell time can also be achieved by producing an increased differential pressure between the entry to the dwell chamber or hold-up chamber and the exit from the dwell chamber.

In one advantageous configuration, in a plant for the manufacture of cement clinker with a rotary kiln and suspension-type gas heat exchanger kiln, the dwell time of the exhaust gases containing $NO_x$ in the cyclone is increased by generating an increased differential pressure in the cyclone between the cyclone entry and the cyclone exit.

This increase in the differential pressure can be achieved by increasing the gas velocity in the cylindrical inlet tube of the cyclone, e.g. by turbulent flow, by reducing the cross section of the cylindrical inlet tube, by designing the cylindrical inlet tube in the form of a truncated cone, or by lengthening the cylindrical inlet tube. It is also possible to increase the size of the cyclone.

The increase of the flow velocity in the cylindrical inlet tube is accompanied by an increase in the differential pressure in the cyclone. The increased gas velocity in the cylindrical inlet tube leads in particular to a pressure reduction at the gas exit with a simultaneous significant counterpressure in the gas inlet opening.

On an apparatus for the performance of the method claimed by the invention, gas guidance devices to increase the gas velocity can advantageously be located in the cylindrical inlet tube of the cyclone.

In one advantageous configuration, the cylindrical inlet tube can comprise plates or lamellae, whereby one or more of the plates can be offset inwardly. The desired turbulence is formed starting from the inner edges of these offset plates, so that the gas remains in the cyclone longer. It is particularly advantageous if externally adjustable plates are used to optimally adjust the hold time to the current operating conditions.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying FIGS. 1 to 7, wherein.

DESCRIPTION OF THE PREFERRED EMBODIMENT

In rotary kiln cement plants, the kiln exhaust gas is frequently discharged via cyclone preheaters. Additionally, cyclone separators can be used to separate material from the exhaust gas. The rotary kiln exhaust gases thereby can flow through the cyclone preheater from bottom to top in countercurrent to the charge. Additionally, in possible embodiments of the present invention, it may be possible to use concurrent flow heat exchangers.

Figure 1:
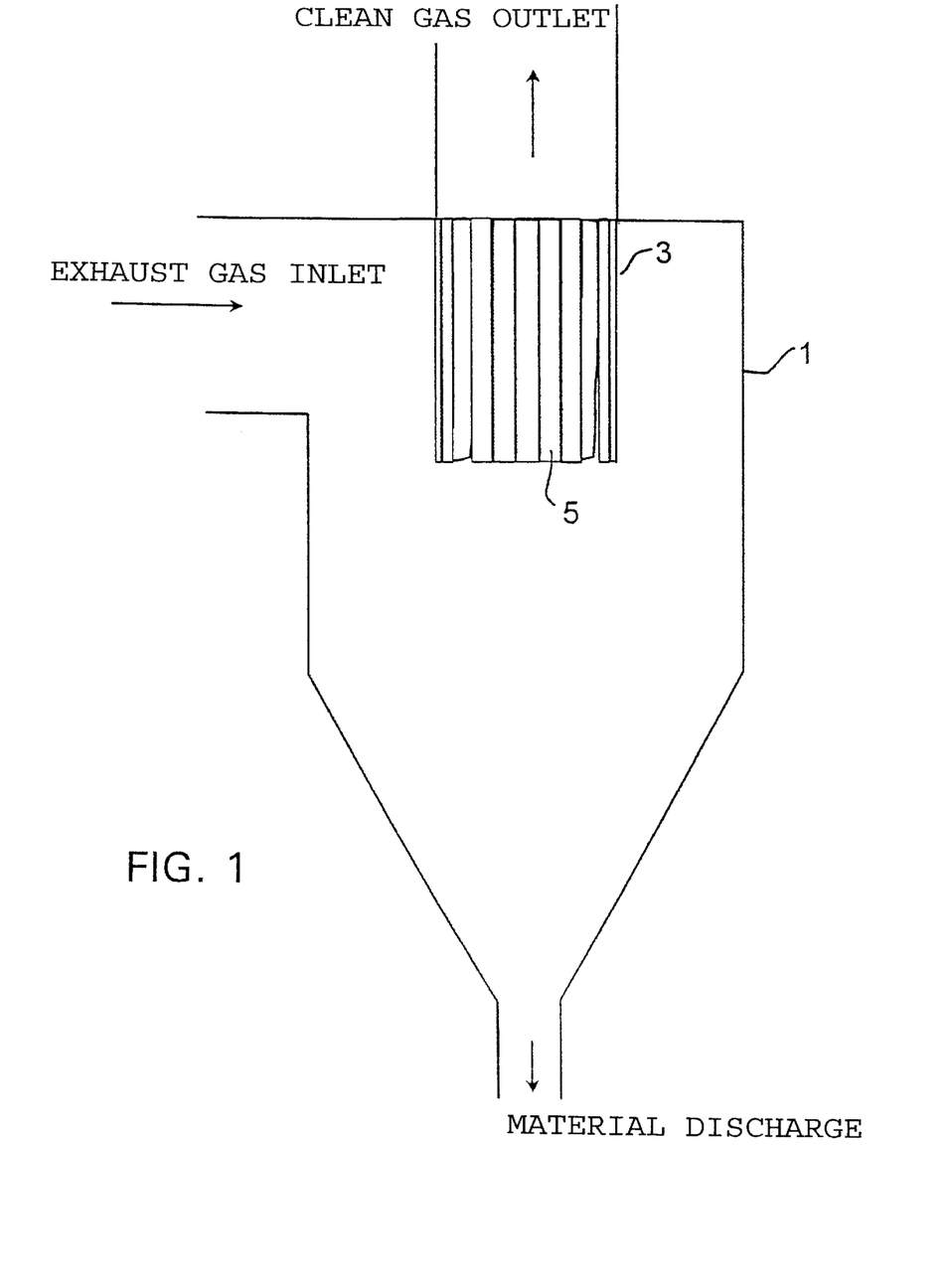
FIG. 1 is a side view of an embodiment of a cyclone in cross section.
Figure 2:
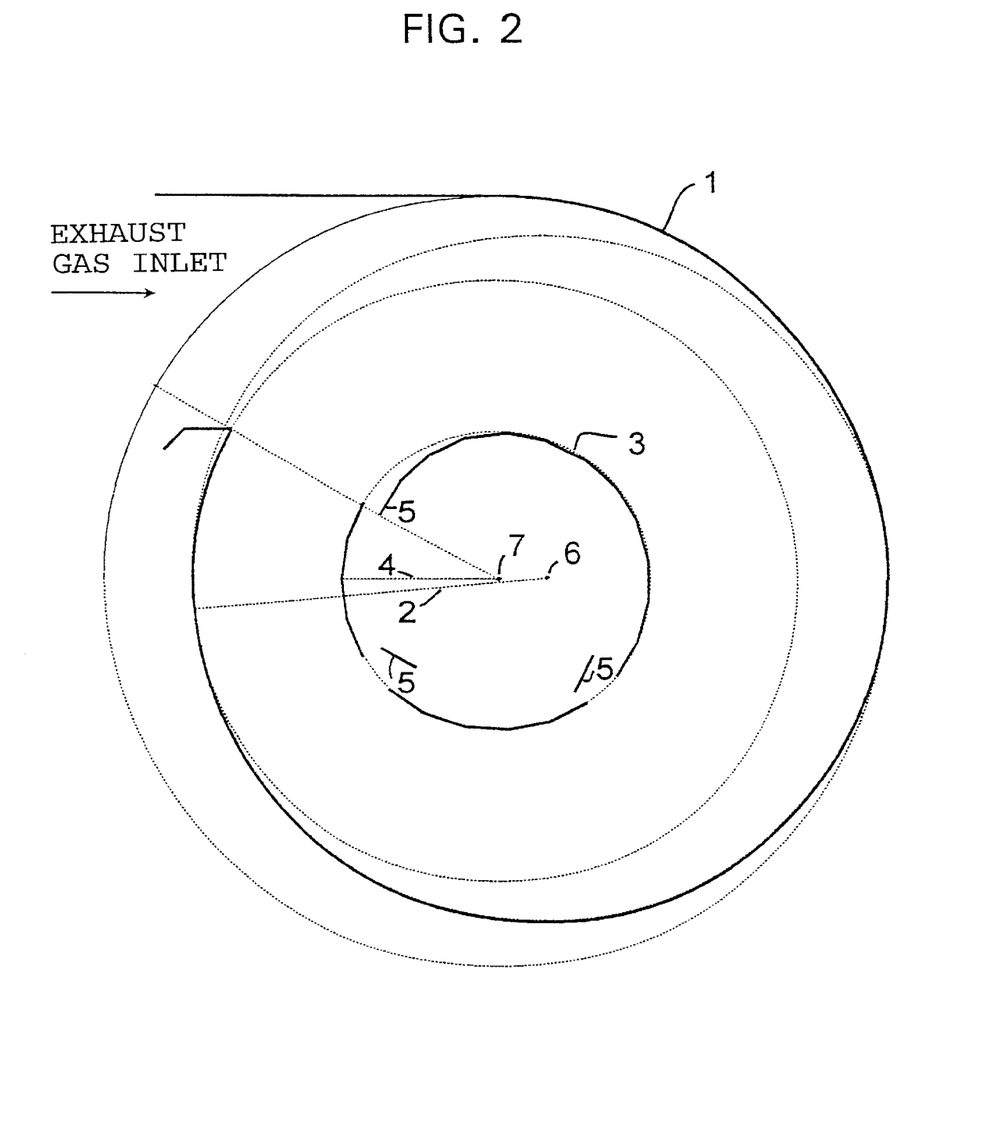
FIG. 2 shows an overhead view of an embodiment of a cyclone in cross section.

FIG. 1 shows a cyclone with a cylindrical inlet tube 3. The gas enters tangentially, as depicted by the arrow in FIG. 1. The gas consists of a gas-solid suspension of particles and rotary kiln exhaust gas. In the cyclone 1, which can operate according to the principle of centrifugal separation, the raw material is separated and discharged at the bottom of the cyclone 1. An intensive heat exchange then occurs between the rotary kiln exhaust gas and the charge. FIG. 1 illustrates one particular embodiment of the cylindrical inlet tube 3, which can be made up of plates 5. The clean gas leaves the cyclone 1 through the cylindrical inlet tube 3 and is conducted to the next higher cyclone preheater stage, or is discharged via an exhaust gas cleaning installation. One possible conventional configuration of the cyclone 1 is illustrated in FIG. 2. The center 7 of the cylindrical inlet tube 3 is displaced in a defined direction with respect to the center 6 of the cyclone wall. The flow through the cyclone chamber, when viewed from above, describes a spiral. In general, therefore, we can also speak of a "spiral casing". The flow in the selected examples is not rotationally symmetrical. The relationships are determined in detail by the radius 2 of the cyclone and the radius 4 of the cylindrical inlet tube.

In at least one possible embodiment of the present invention, the cyclone can act as a separator that removes particles from the exhaust gas then feeds "cleaned" exhaust gas into a separate heat exchanger body. The material removed by the cyclone may include at least product, and unused raw material.

In other possible embodiments of the present invention, the inlet tube 3 can represent an outlet tube. In possible embodiments of the present invention, the cyclone can 1 act as a separator, and/or as a heat exchanger. The cyclone 1 itself can function as a dwell chamber, or the dwell chamber can be external to the cyclone.

Figure 3:
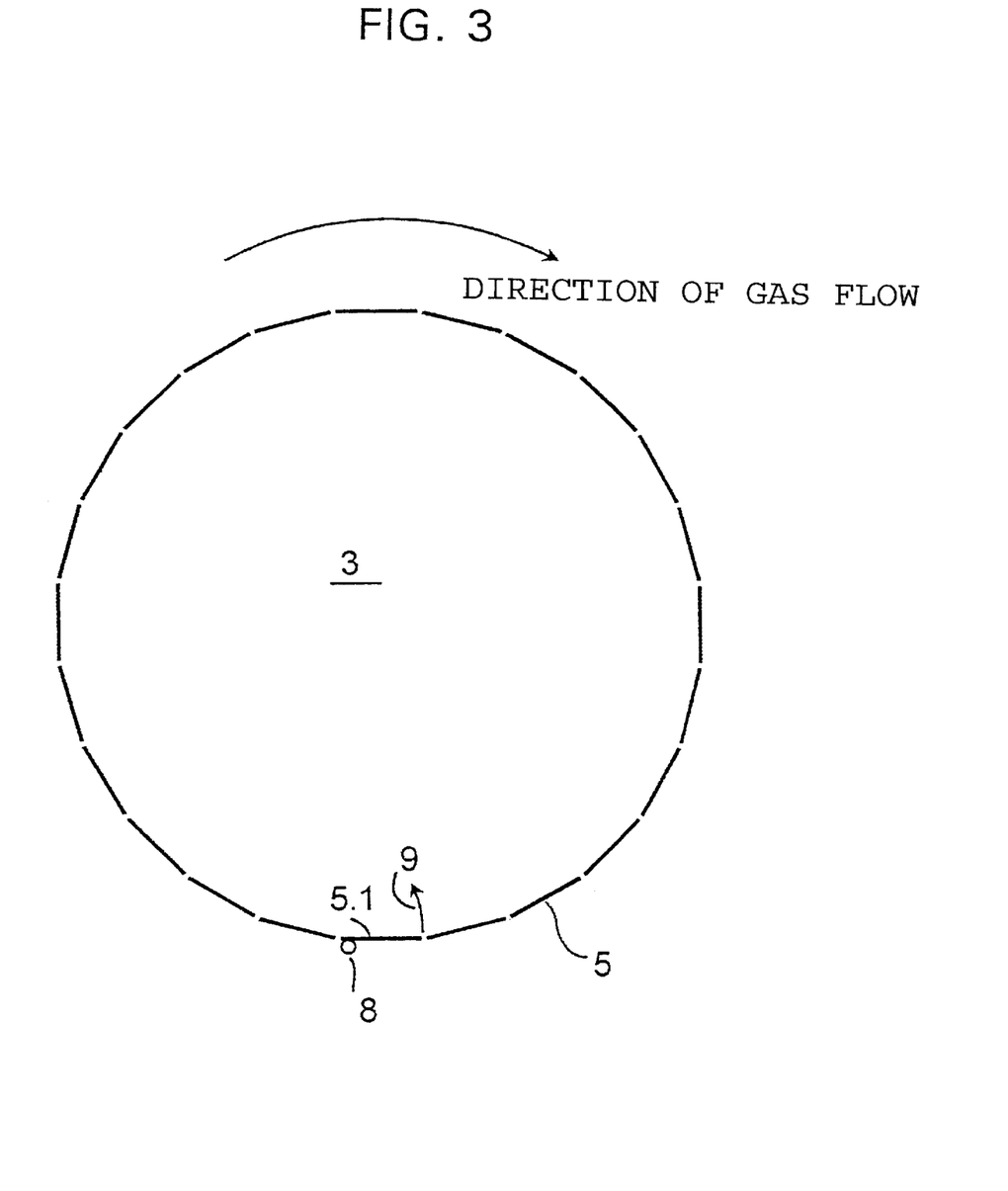
FIG. 3 shows a detail of an embodiment of the cylindrical inlet tube in cross section and in an overhead view.
Figure 4:
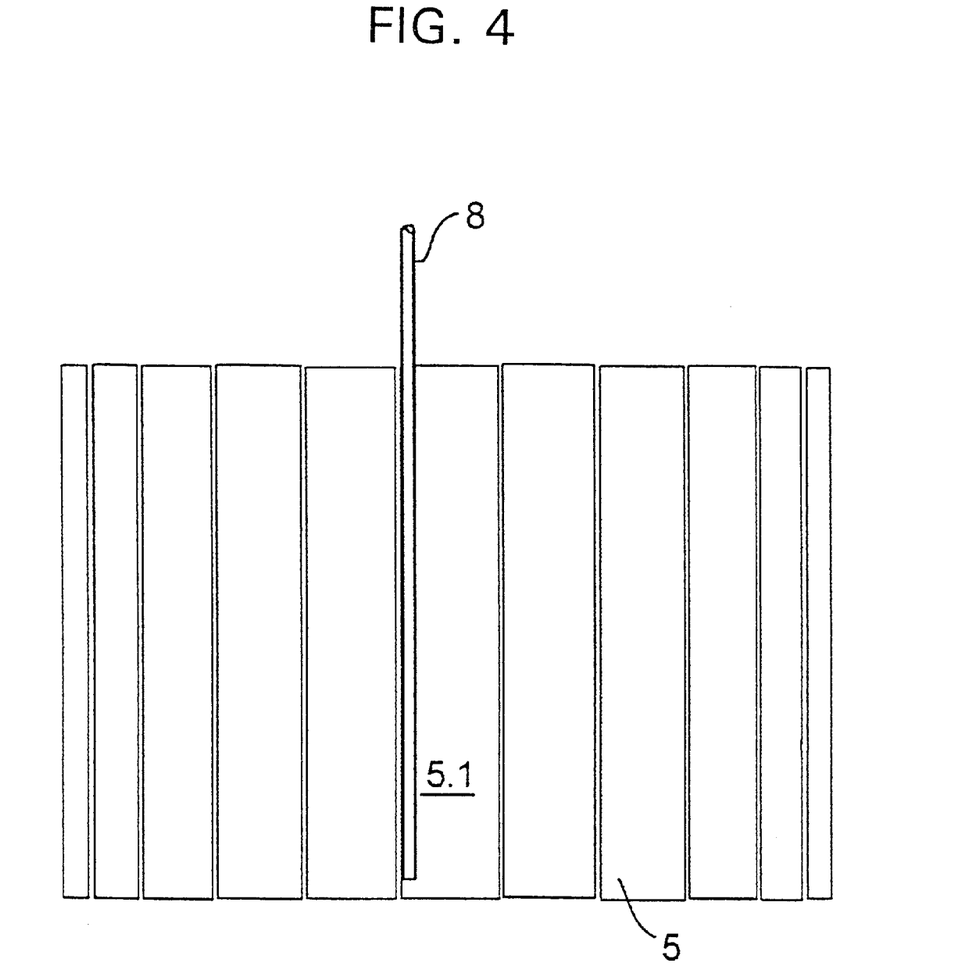
FIG. 4 shows a side view of an embodiment of the cylindrical inlet tube.

It has been found that the dwell time in the cyclone can be increased if individual plates 5 of the cylindrical inlet tube 3 are displaced inward, as illustrated in FIG. 2. For the control of the dwell time increase, it is appropriate if one or more plates 5 are made movable. As shown in FIG. 3, the axis of rotation 8 is on the rear edge, as seen in the direction of the gas current, of one of the movable plates 5.1. The plate 5.1 can be adjusted so that the forward edge is deflected inward in the direction of rotation 9. FIG. 4 shows this same system of plates 5, rotatable or movable plate 5.1 and axis of rotation 8 in a side view.

A number of different configurations with different spirals can be used to influence the flow and thus the separation and the pressure loss. The inlet and outlet cross sections can also be configured in a number of different ways.

Initial operating experience with the method claimed by the invention has shown that the measures claimed by the invention make it possible to achieve a significant reduction in $NO_x$ emissions in the temperature range from approximately 450° C. to about 800° C., so that there is essentially no need for the conversion of the plant for selective, non-catalytic reduction.

It has also been found to be advantageous to increase the degree of dust removal.

The method claimed by the invention can also be used, however, even without the separation of the particulate portions. It can also be suitable for other types of combustion plants, such as tunnel furnaces or exhaust gas treatment installations for glass melting pans in the glass industry.

Figure 5:
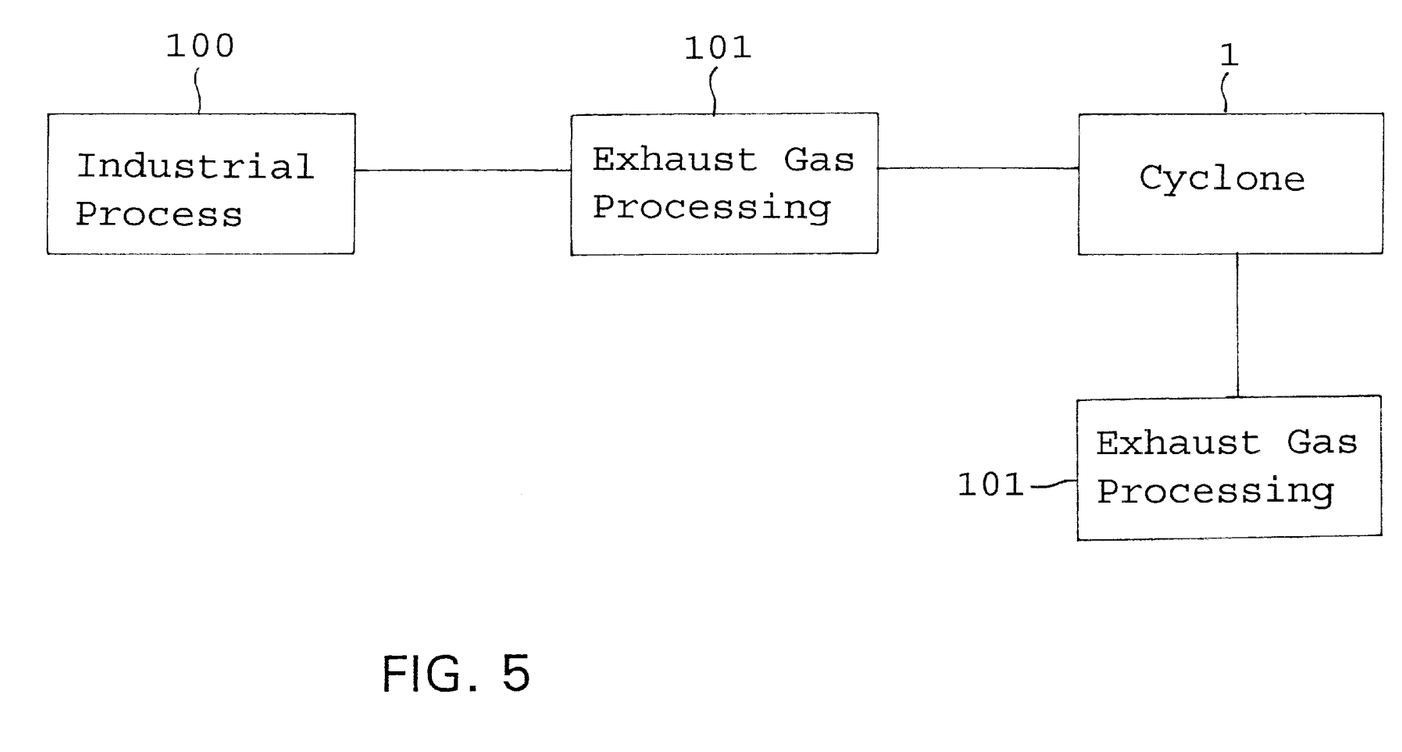
FIG. 5 shows in a block diagram a possible industrial process wherein the present invention could possibly be utilized.

FIG. 5 illustrates a possible industrial process wherein an embodiment of the present invention could be utilized. Following the production of exhaust gas from the industrial process 100, the exhaust gas is processed 101. The cyclone 1 can be a separator, as opposed to a heat exchanger. Alternatively, in possible embodiments of the present invention, the cyclone 1 can be used as a heat exchanger as described above. The exhaust gas could then undergo further processing 101.

Figure 6:
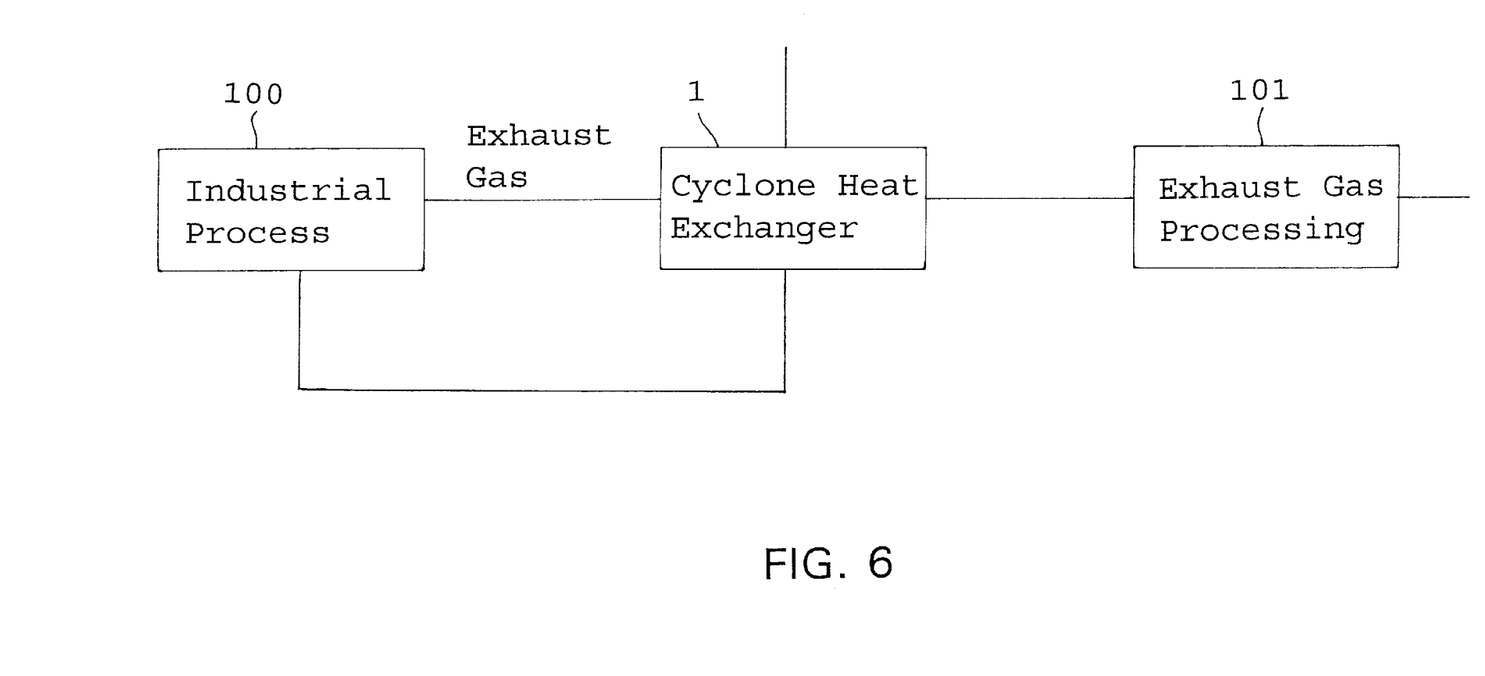
FIG. 6 shows in a block diagram another possible industrial process wherein the present invention could possibly be utilized.

Alternatively, FIG. 6 illustrates by a block diagram another possible embodiment of the present invention, wherein the cyclone 1 can function as a heat exchanger, and can be entrained downstream in the exhaust gas chain from the industrial process 100, which industrial process 100 could be, for example, the production of cement clinker, and subsequent to the cyclone heat exchanger 1 can be additional exhaust gas processing 101. This cyclone heat exchanger 1 can be used as the dwell chamber or hold-up chamber.

Figure 7:
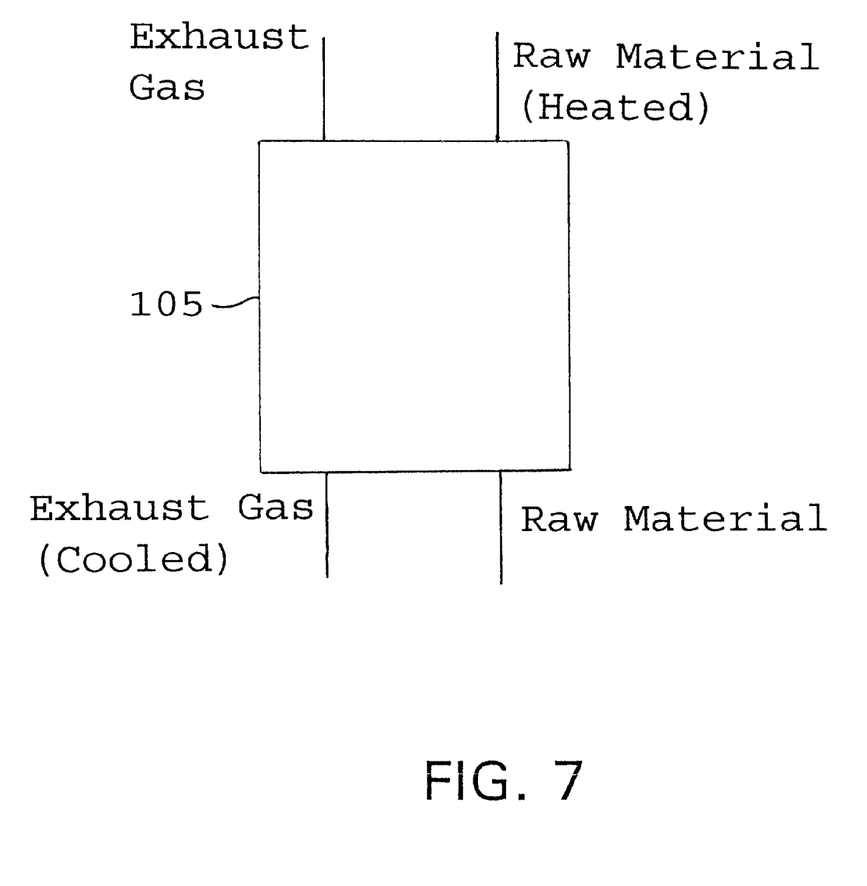
FIG. 7 shows a block diagram of a countercurrent heat exchanger.

FIG. 7 shows a block diagram indicating a countercurrent heat exchanger 105 which may be used in embodiments of the present invention. Heat exchanger 105 shows high temperature exhaust gas entering at the top stage, and low temperature raw material entering at the bottom stage. Cooled exhaust gas then exits at the bottom stage and heated raw material exits at the top stage.

$NO_x$ decomposition may occur, in accordance with the present invention, for example, at temperatures of or about any one of, or about any range contained between any two of, any of the following temperatures: 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C., 600° C., 610° C., 620° C., 630° C., 640° C., 650° C., 660° C., 670° C., 680° C., 690° C., 700° C., 710° C., 720° C., 730° C., 740° C., 750° C., 760° C., 770° C., 780° C., 790° C., 800° C., 810° C., 820° C., 830° C., 840° C. and 850° C. While these temperatures indicate possible temperatures or temperature ranges of decomposition of $NO_x$, they are not being presented as absolute limits to possible ranges of temperatures with which the present invention may be utilized.

Combustion processes used in the present invention may, for example, have combustion temperatures of about any one of, or about any range contained between any two of, any of the following temperatures: 850° C., 875° C., 900° C., 925° C., 950° C., 975° C., 100° C., 1025° C., 1050° C., 1075° C., 1100° C., 1125° C., 1150° C., 1175° C., 1200° C., 1225° C., 1250° C., 1275° C., 1300° C., 1325° C., 1350° C., 1375° C., 1400° C., 1425° C., 1450° C., 1475° C., 1500° C., 1525° C., 1550° C., 1575° C., 1600° C., 1625° C., 1650° C., 1675° C.; 1700° C., 1725° C., 1750° C., 1775° C., 1800° C., 1825° C., 1850° C., 1875° C., 1900° C., 1925° C., 1950° C., 1975° C., 2000° C., 2025° C., 2050° C., 2075° C., 2100° C., 2125° C., 2150° C., 2175° C., 2200° C., 2225° C., 2250° C., 2275° C., 2300° C., 2325° C., 2350° C., 2375° C., 2400° C., 2425° C., 2450° C., 2475° C., 2500° C., 2525° C., 2550° C., 2575° C., 2600° C., 2625° C., 2650° C., 2675° C., 2700° C., 2725° C., 2750° C., 2775° C., 2800° C., 2825° C., 2850° C., 2875° C., 2900° C., 2925° C., 2950° C., 2975° C. and 3000° C. While these temperatures indicate possible temperatures or temperature ranges of combustion, which combustion produces $NO_x$, they are not being presented as limits to possible ranges of temperatures with which the present invention may be utilized.

One feature of the invention resides broadly in the method for the reduction of $NO_x$ emissions in the exhaust gas of plants with NOx formation as a result of combustion processes, in which the $NO_x$ decomposition occurs in the temperature range from about 450° C. to about 800° C. and in an oxidizing atmosphere with a fuel-air ratio (Lambda) is greater than about 1, characterized by the fact that the exhaust gas containing $NO_x$ is conducted through a dwell chamber to increase the dwell time.

Another feature of the invention resides broadly in the method characterized by the fact that the increase in the dwell time of the exhaust gases containing NOx in the dwell chamber is achieved by reducing the flow velocity between the dwell chamber entry and the dwell chamber exit.

Yet another feature of the invention resides broadly in the method characterized by the fact that the flow velocity of the exhaust gas containing $NO_x$ is reduced by increasing the cross section of the dwell chamber through which the flow passes.

Still another feature of the invention resides broadly in the method characterized by the fact that the exhaust gas containing $NO_x$ is conducted through a dwell chamber realized in the form of a spiral casing with a cylindrical inlet tube.

A further feature of the invention resides broadly in the method characterized by the fact that the dwell time of the exhaust gases containing $NO_x$ in the dwell chamber is increased by producing a higher differential pressure between the dwell chamber entry and the dwell chamber exit.

Another feature of the invention resides broadly in the method characterized by the fact that the dwell time of the exhaust gases containing $NO_x$ from a plant for the production of cement clinker with rotary kilns and suspension-type heat exchanger kilns is increased by generating a higher differential pressure between the cyclone entry and the cyclone exit.

Yet another feature of the invention resides broadly in the method characterized by the fact that the dwell time of the exhaust gases containing $NO_x$ is increased by generating a turbulent flow in the cyclone.

Still another feature of the invention resides broadly in the method characterized by the fact that the velocity in the cylindrical inlet tube of the cyclone is increased.

A further feature of the invention resides broadly in the apparatus for the performance of the method characterized by the fact that gas guidance devices to increase the gas velocity are located in the cylindrical inlet tube of the cyclone.

Another feature of the invention resides broadly in the apparatus characterized by the fact that the cylindrical inlet tube consists of plates and that one or more of the plates are offset inwardly.

Yet another feature of the invention resides broadly in the apparatus characterized by the fact that the plates can be adjusted from outside.

The following U.S. Patents, which may contain methods and structure for the removal of $NO_x$ from gases, are hereby incorporated by reference as if set forth in their entirety herein: No. 4,656,148, issued Apr. 7, 1987; No. 4,828,806, issued May 9, 1989; No. 4,672,052, issued Jun. 9, 1987; No. 4,695,559, issued Sep. 22, 1987; No. 4,720,376, issued Jan. 19, 1988; No. 4,806,427, issued Feb. 21, 1989; No. 4,721,699, issued Jan. 26, 1988; No. 4,751,212, issued Jun. 14, 1988; No. 4,771,026, issued Sep. 13, 1988; No. 4,950,473, issued Aug. 21, 1990; and No. 4,935,392, issued Jun. 19, 1990.

U.S. Pat. No. 4,674,418, issued Jun. 23, 1987, which may contain structure for a cyclone and associated equipment, which may be used in embodiments of the present invention, is hereby incorporated by reference as if set forth in its entirety herein.

Examples of cyclones, and cyclone heat exchangers, which may be incorporated in embodiments of the present invention may be found in the following U.S. Patents: U.S. Pat. No. 5,378,323, issued Jan. 3, 1995; No. 5,393,315, issued Feb. 28, 1995; No. 5,440,823, issued Aug. 15, 1995; No. 5,441,714, issued Aug. 15, 1995; and No. 5,474,584, issued Dec. 12, 1995.

Examples of methods for making cement clinker, and structures which can be utilized with methods of making cement clinker, may be found in the following U.S. Patents: No. 5,383,967, issued Jan. 24, 1995; No. 5,392,998, issued Feb. 28, 1995; No. 5,393,342, issued Feb. 28, 1995; No. No. 5,417,760, issued May 23, 1995; No. 5,419,698, issued May 30, 1995; No. 5,421,880, issued Jun. 6, 1995; No. 5,429,675, issued Jul. 4, 1995; No. 5,433,157, issued Jul. 18, 1995; No. 5,437,721, issued Aug. 1, 1995; No. 5,449,404, issued Sep. 12, 1995; No. 5,454,714, issued Oct. 3, 1995; No. 5,462,237, issued Oct. 31, 1995; No. 5,472,917, issued Dec. 5, 1995; No. 5,475,220, issued Dec. 12, 1995; No. 5,476,377, issued Dec. 19, 1995; No. 5,478,234, issued Dec. 26, 1995; and No. 5,478,391, issued Dec. 26, 1995.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 197 46 817.9-43, filed on Oct. 23, 1997, having inventors Dr. Armin Frohlich, Maria Regina Monnig, and Siegfried Happrich, and DE-OS 197 46 817.9-43 and DE-PS 197 46 817.9-43, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. In a combustion process, a method of reducing $NO_x$ emissions from plants, by providing a dwell chamber in which $NO_x$ decomposition occurs substantially solely as a result of the time the emissions dwell in the dwell chamber in a temperature range from about 450 degrees Celsius to 790 degrees Celsius, said method comprising the steps of:

forming $NO_x$ in a combustion process to form an exhaust gas;

transferring exhaust gas from the combustion process to a dwell chamber to increase the dwell time of the exhaust gas;

at least partially decomposing the $NO_x$ in the exhaust gas in the dwell chamber substantially solely as a result of the time the emissions dwell in the dwell chamber in a temperature range from about 450 degrees Celsius to 790 degrees Celsius in an oxidizing atmosphere;

expelling the exhaust gas from the dwell chamber;

wherein said step of at least partially decomposing the $NO_x$ in the exhaust gas in the dwell chamber in a temperature range from about 450 degrees Celsius and 790 degrees Celsius in an oxidizing atmosphere further comprises maintaining the temperature of the exhaust gas in the dwell chamber between about 450 degrees Celsius and 790 degrees Celsius to permit the $NO_x$ to decompose;

wherein said step of forming $NO_x$ in a combustion process to form an exhaust gas further comprises forming $NO_x$ with a fuel-air ratio (Lambda) greater than about 1; and decreasing the flow velocity between an entry to the dwell chamber and an exit of the dwell chamber to increase the dwell time of the exhaust gas in the dwell chamber.

2. The method according to claim 1 wherein said step of decreasing the flow velocity between an entry to the dwell chamber and an exit of the dwell chamber to increase the dwell time of the exhaust gas in the dwell chamber comprises the step of increasing the cross-sectional area of the dwell chamber through which the exhaust gas passes.

3. The method according to claim 2 wherein the dwell chamber comprises:

a spiral casing; and a cylindrical inlet tube for entry of the exhaust gas.

4. The method according to claim 3 wherein said step of decreasing the flow velocity between an entry to the dwell chamber and an exit of the dwell chamber to increase the dwell time of the exhaust gas in the dwell chamber further comprises the step of increasing the differential pressure between the dwell chamber entry and the dwell chamber exit.

5. The method according to claim 4 in a plant for the production of cement clinker, the plant having rotary kilns and heat exchangers to exchange heat of a suspension, wherein:

the dwell chamber comprises a cyclone; and said step of increasing the differential pressure between the dwell chamber entry and the dwell chamber exit comprises the step of increasing the differential pressure between the cyclone entry and the cyclone exit.

6. The method according to claim 5 further comprising the step of generating a turbulent flow in the cyclone to increase the dwell time of the exhaust gas in the cyclone.

7. The method according to claim 6 wherein said step of increasing the differential pressure between the cyclone entry and the cyclone exit comprises the step of increasing the velocity of the exhaust gas in the cylindrical inlet tube of the cyclone.

8. In a combustion process, a method of reducing $NO_x$ emissions from plants, with an apparatus for the reduction of $NO_x$ emissions from plants with $NO_x$ formation as a result of combustion processes, in which the $NO_x$ decomposition occurs in the temperature range from about 450° C. to about 790° C. said apparatus comprising: a cyclone; said cyclone being configured to receive exhaust gas containing $NO_x$; said cyclone being configured to maintain the temperature of the exhaust gas in the cyclone between about 450° C. and about 790° C. to allow the $NO_x$ in the exhaust gas to decompose in the cyclone; said cyclone comprising a substantially cylindrical inlet tube to receive exhaust gas; said cyclone comprising a substantially spiral casing; and said cyclone comprising an exit to release exhaust gas; said method comprising the steps of:

forming $NO_x$ in a combustion process to form an exhaust gas;

transferring exhaust gas from the combustion process to a dwell chamber to increase the dwell time of the exhaust gas; at least partially decomposing the $NO_x$ in the exhaust gas in the dwell chamber in a temperature range from about 450° C. to about 790° C. in an oxidizing atmosphere; and expelling the exhaust gas from the dwell chamber.

9. In a combustion process, a method of reducing $NO_x$ emissions from plants, by providing a dwell chamber in which $NO_x$ decomposition occurs in a temperature range from about 450 degrees Celsius to 790 degrees Celsius, said method comprising the steps of:

forming $NO_x$ in a combustion process to form an exhaust gas;

transferring exhaust gas from the combustion process to a dwell chamber to increase the dwell time of the exhaust gas;

at least partially decomposing the $NO_x$ in the exhaust gas in the dwell chamber in a temperature range from about 450 degrees Celsius to 790 degrees Celsius in an oxidizing atmosphere;

expelling the exhaust gas from the dwell chamber;

wherein said step of at least partially decomposing the $NO_x$ in the exhaust gas in the dwell chamber in a temperature range from about 450 degrees Celsius to 790 degrees Celsius in an oxidizing atmosphere further comprises maintaining the temperature of the exhaust gas in the dwell chamber between about 450 degrees Celsius and 790 degrees Celsius to permit the $NO_x$ to decompose;

wherein said step of forming $NO_x$ in a combustion process to form an exhaust gas further comprises forming $NO_x$ with a fuel-air ratio (Lambda) greater than about 1; and decreasing the flow velocity between an entry to the dwell chamber and an exit of the dwell chamber to increase the dwell time of the exhaust gas in the dwell chamber.

10. The method according to claim 9, wherein said step of decreasing the flow velocity between an entry to the dwell chamber and an exit of the dwell chamber to increase the dwell time of the exhaust gas in the dwell chamber comprises the step of increasing the cross-sectional area of the dwell chamber through which the exhaust gas passes.

11. The method according to claim 10, wherein said step of decreasing the flow velocity between an entry to the dwell chamber and an exit of the dwell chamber to increase the dwell time of the exhaust gas in the dwell chamber further comprises the step of increasing the differential pressure between the dwell chamber entry and the dwell chamber exit.

12. The method according to claim 11 in a plant for the production of cement clinker, the plant having rotary kilns and heat exchangers to exchange heat of a suspension, wherein:

the dwell chamber comprises a cyclone; and said step of increasing the differential pressure between the dwell chamber entry and the dwell chamber exit comprises the step of increasing the differential pressure between the cyclone entry and the cyclone exit.

13. The method according to claim 12, said method further comprising the step of generating a turbulent flow in the cyclone to increase the dwell time of the exhaust gas in the cyclone.

14. The method according to claim 13, wherein said step of increasing the differential pressure between the cyclone entry and the cyclone exit comprises the step of increasing the velocity of the exhaust gas in the cylindrical inlet tube of the cyclone.

* * * * *